Figures 1, 2:
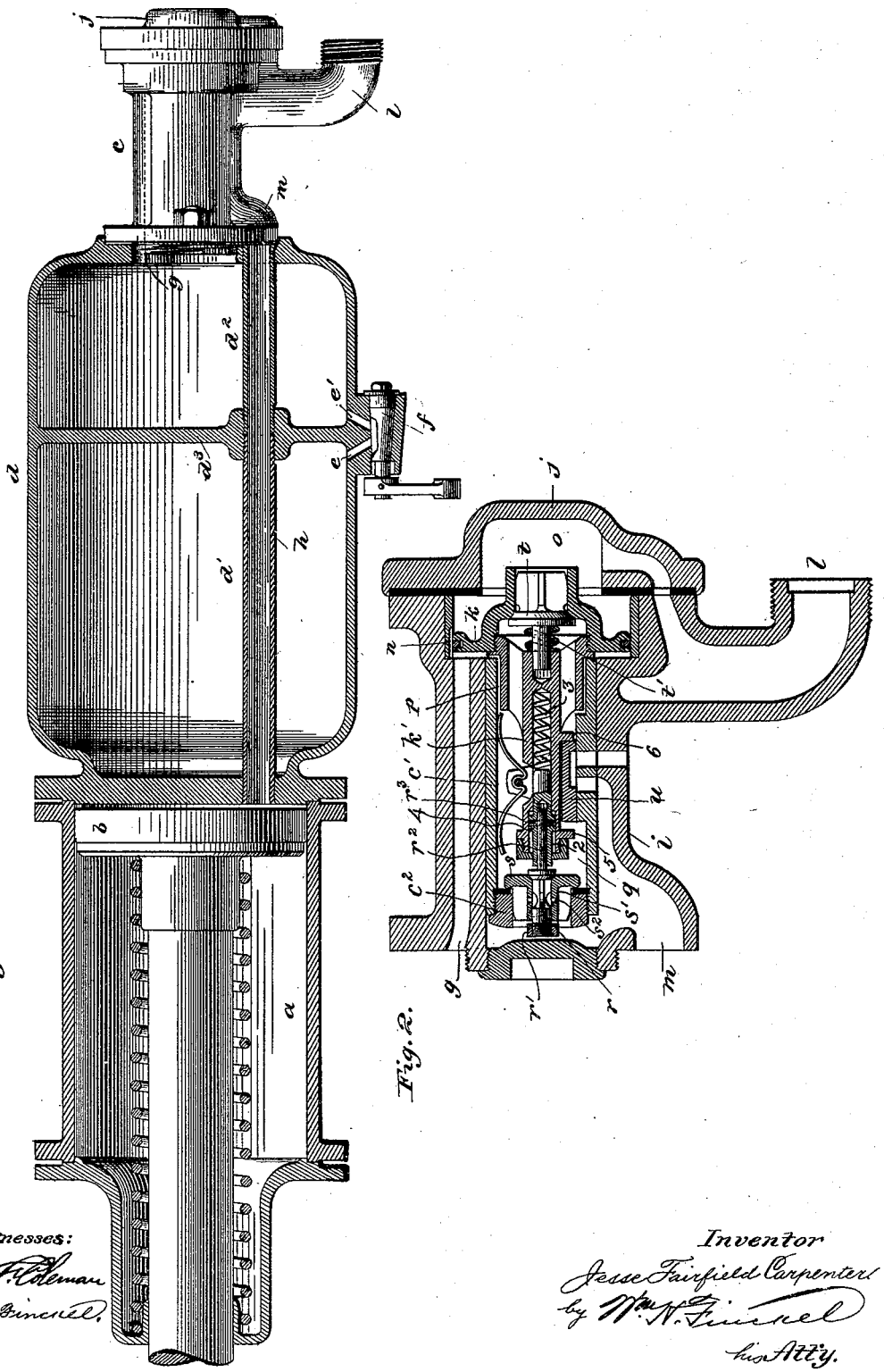

(No Model.)

J. F. CARPENTER.
AIR BRAKE.

No. 479,736. Patented July 26, 1892.

Witnesses:

Inventor
Jesse Fairfield Carpenter
by Wm. N. Finnell
his Atty.

UNITED STATES PATENT OFFICE.

JESSE FAIRFIELD CARPENTER, OF WASHINGTON, DISTRICT OF COLUMBIA.

AIR-BRAKE.

SPECIFICATION forming part of Letters Patent No. 479,736, dated July 26, 1892.

Application filed December 15, 1891. Serial No. 415,167. (No model.)

*To all whom it may concern:*

Be it known that I, JESSE FAIRFIELD CARPENTER, a citizen of the United States, residing at Washington, in the District of Columbia, have invented a certain new and useful Improvement in Air-Brakes, of which the following is a full, clear, and exact description.

This invention relates to automatic quick-acting air-brakes.

The invention consists, first, in a so-called "quick-acting triple valve," which has fewer parts and fewer and more direct through-passages than commonly found in ordinary air-brakes of this character.

The invention also consists in the means whereby the effective brake force applied to each car may be easily varied at will through the simple shifting of a cock under each car by hand in passing along the train, so that the brakemen in making up trains can vary the brake force on loaded and empty cars by shifting these cocks, and thus prevent a skidding of the wheels on the one side which follows the application of too much brake force to the empty cars, and also thus prevent inefficient braking, on the other hand, through the application of too little force to the loaded cars.

In the accompanying drawings, illustrating my invention, in the two figures of which like parts are similarly designated, Figure 1 is a side elevation showing the auxiliary reservoir and brake-cylinder in section, and Fig. 2 is a longitudinal section of the triple valve.

$a$ is the brake-cylinder with a piston $b$ therein.

$c$ is the quick-action triple valve.

$d$ is the auxiliary reservoir, which is divided into two chambers $d'$ and $d^2$ by a fixed partition $d^3$. These two chambers communicate with each other through the passages $e$ and $e'$ and the plug-cock $f$. The small chamber $d^2$ of the reservoir communicates directly with the triple valve through passage $g$, and also communicates with the brake-cylinder through the triple valve and the passage or pipe $h$. If now the cock $f$ be turned in one position, it cuts off the communication between the two chambers of the auxiliary reservoir, so that the application of the brake is effected only by means of the air-pressure stored in chamber $d^2$ of the reservoir. If the cock, on the other hand, be turned in the other position, the two chambers of the auxiliary reservoir are communicating and the air-pressure in both chambers of the reservoir will be available for use in the brake-cylinder. In other words, as the brake force or air-pressure upon the piston is relatively dependent upon the size of the reservoir from which it is drawn, the varying of the size of this reservoir is the easiest means for varying the pressure applied to the brake-piston. In common practice it will be found best to make the chamber $d'$ double the capacity of chamber $d^2$, so that, roughly stated, a loaded car will have three times the brake force exerted upon it that an empty one would, where only the first third of the reservoir came into use. It will be easily understood that the cock $f$ might be shifted by means of simple rods passing out from under the car to a convenient point on each side of the same where the trainmen could easily operate them without getting under the car.

In the quick-action triple valve $c$, $i$ is the body or case, $j$ the back cover, and $k$ the main piston moving therein. The train-pipe connects with the valve at $l$. The passage $g$ connects with the reservoir, the passage $m$ with the brake-cylinder. Air-pressure entering from the train-pipe at $l$ passes up through the back cover $j$, behind the piston $k$, and through a small groove $n$ at the top of passage $g$ to the reservoir, charging the same. If now the pressure in the train-pipe $l$ be slightly reduced, the pressure back of the piston $k$ in chamber $o$ will also be reduced and the pressure from the reservoir passing through the passage $g$ will act upon the back part of the piston $k$, driving it to the right, when by means of the small passage $p$ air-pressure will pass into the chamber $q$, thence through the small valve $r$ to the brake-cylinder, the slight reduction that was made in the train-pipe being only sufficient to move the valve-piston $k$ slightly and raise the small valve $r$. The resistance of the large valve $s$ prevents the piston $k$ from going farther.

If, instead of a slight reduction, a large reduction has been made in the train-pipe, the opposite force of the air acting upon piston $k$ would be sufficient to move the same its full stroke to the left and the large valve $s$ would be opened. This would cause a sudden exhaustion of air from the chamber $q$, which the inflowing air, through the small passage $p$, would be unable to materially reinforce, and thus the pressure in the chamber $q$ would suddenly fall below the pipe-pressure and the latter would force open the check-valve $t$, whereby air from the train-pipe would have a direct passage to the brake-cylinder without passing through the reservoir at all. The heavy spring $t'$ on top of valve $t$ serves to close the same before the pressures are equalized, and also serves to prevent failure to release the brake through pressure from train-pipe, recharging the auxiliary reservoir without first moving back the main piston $k$ and releasing the brake-pressure in cylinder through slide-valve $u$.

In order to have the check-valve $t$ in the main piston $k$ work direct as an automatic exhaust from the main pipe to the brake-cylinder, it is necessary that while the main reservoir should exert full pressure by means of the large port $g$ upon the reservoir side of the valve-piston $k$ the reservoir should only have a contracted access by the small port $p$, or simply by leakage around the trunk of the piston $k$ to the brake-cylinder or to the chamber $q$, containing the inlet-valves $r$ and $s$, to the brake-cylinder, which chamber must, however, form a large through-passage from the check-valve $t$ to the large inlet-port to the brake-cylinder.

The casing of the quick-action triple valve $c$ is made with the usual lining $c'$, and in one end of this lining is secured the annular seat $c^2$ for the valve $s$, said valve being a flat valve with a winged stem $s'$, working in the annular seat to guide the said valve. The stem $s'$ is hollow and perforated transversely with holes $s^2$, which constitute ports for the passage of air admitted through valve $r$. This valve $r$ seats in the flat portion of valve $s$, and also has a solid portion fitting in the bore of stem $s'$, and between these portions the valve $r$ is cut away or made as a skeleton about the ports $s^2$. The passage controlled by the valve $s$ is relatively larger than the passage controlled by the valve $r$. The valve $r$ has a nut $r'$ applied to one end which abuts against the end of the stem $s'$, and thereby said valve $r$ would be closed by the closing of valve $s$; but there is also a limit of free and independent movement of valve $r$ by reason of the fact that its stem is longer than the stem $s'$. The stem $k'$ of the piston $k$ is hollow and is provided with a slide 2, normally projected from the stem by a spring 3 and limited in movement by the collar 4 within the hollow stem. The valve $r$ has a rod extension $r^2$, which is secured by a pin $r^3$ or otherwise to the slide 2 and moves with it. Obviously the movement of the piston is imparted to the slide and the valve $r$ and through valve $r$ and its nut $r'$ to the valve $s$ under the restrictions of the spring 3 and the collar 4. The valve $r$ upon a sufficient movement of the piston to the right would open first and upon further movement of the piston would pull open the valve $s$. The stem $k'$ has usual lugs 5 and 6 for moving the slide $u$. The passage $p$ is larger than the passage of valve $r$, but smaller than the passage of valve $s$, for the purposes already stated.

What I claim is—

1. An auxiliary reservoir divided into two chambers, combined with a passage between said chambers, a valve in said passage, and an operating hand-lever for the valve within convenient reach of trainmen, to be actuated by hand in making up trains, substantially as described, and for the purposes specified.

2. In an automatic valve for train-brakes, the combination of the main piston, the check-valve therein, and the slide-valve connected with and operated by the piston for releasing the brakes, with the valve $r$, carried by the piston and controlling a small passage to the brake-cylinder, and the valve $s$, in which the valve $r$ and its passage are located and itself controlling a large passage to the brake-cylinder, substantially as described.

3. The combination of the piston and the slide-valve $u$ for releasing the brakes, the valves $r$ and $s$ for controlling the passage of air to the brake-cylinder, the former seating within the latter and both actuated by the piston, the chamber $q$, the check-valve in the piston, and the passage $p$ between the auxiliary reservoir and the chamber $q$ and made larger than the passage through the valve $r$, but smaller than the passage through the valve $s$, substantially as described.

In testimony whereof I have hereunto set my hand this 14th day of December, A. D. 1891.

J. FAIRFIELD CARPENTER.

Witnesses:
WM. H. FINCKEL,
E. A. FINCKEL.